(12) United States Patent
Rauschenberger

(10) Patent No.: US 6,490,991 B2
(45) Date of Patent: Dec. 10, 2002

(54) DOWN RIGGER MOUNT BRACKET

(76) Inventor: Michael Rauschenberger, 5024 Vantage Cresent NW., Calgary, Alberta (CA), T3A 1X7

( * ) Notice: Subject to any disclaimer, the term of this patent is extended or adjusted under 35 U.S.C. 154(b) by 0 days.

(21) Appl. No.: 09/848,672

(22) Filed: May 4, 2001

(65) Prior Publication Data

US 2002/0162499 A1 Nov. 7, 2002

(51) Int. Cl.[7] .......................... A01K 97/10; B63B 17/00
(52) U.S. Cl. .......................... 114/364; 114/345; 43/21.2
(58) Field of Search ......................... 43/21.2, 27.4; 114/364, 343, 345

(56) References Cited

U.S. PATENT DOCUMENTS

| | | | | |
|---|---|---|---|---|
| 4,901,469 A | * | 2/1990 | Murray | 43/21.2 |
| 4,947,777 A | * | 8/1990 | Yoder | 114/221 R |
| 5,673,507 A | * | 10/1997 | Stokes, Jr. | 114/364 |
| 5,791,613 A | * | 8/1998 | Grable | 248/200.1 |

* cited by examiner

Primary Examiner—Sherman Basinger
(74) Attorney, Agent, or Firm—Sean W. Goodwin

(57) ABSTRACT

A mounting bracket adapted for mounting downriggers to inflatable boats comprising an arcuate arm extending between the boat's gunwale and transom board. A clamp is adapted for affixing the arcuate arm to a lip on the gunwale. A flange is adapted for affixing the arcuate arm to the transom board. The arm is rotatable about the clamp and adjustable in length for easy installation and to fit a variety of sizes of inflatable boats.

9 Claims, 2 Drawing Sheets

DOWN RIGGER MOUNT BRACKET

FIELD OF THE INVENTION

This invention relates to downriggers for boats and more particularly to brackets for mounting of downriggers to inflatable boats having at least a transom board.

BACKGROUND OF THE INVENTION

Applicant is not aware of apparatus for supporting downriggers on inflatable boats. Large apparatus such as bridge structures are known for support on hard-hulled boats as shown in U.S. Pat. No. 5,673,507 to Stokes, Jr., U.S. Pat. No. 4,901,469 to Murray, and U.S. Pat. No. 5,791,613 to Grable. Smaller clamp devices are known for mounting a downrigger to a sidewall such as that disclosed in U.S. Pat. No. 4,947,777 to Yoder.

SUMMARY OF THE INVENTION

The apparatus of the present invention is a downrigger mounting bracket which is specifically designed for imparting greater stability to a downrigger when used with inflatable boats typically used for deep sea fishing. A mounting bracket for the use of downriggers on inflatable boats comprises an arcuate arm extending between the boat's gunwale and the usual transom board at the boat's stern. An assembly or clamp at one end is adapted for affixing the arcuate arm to a lip on the gunwale. A flange at the other end is adapted for affixing the arcuate arm to the transom board. The arm is rotatable about the clamp and adjustable in length for easy installation and to fit a variety of sizes of inflatable boats. When manufactured of aluminum, the bracket is lightweight and rust free.

In one broad aspect of the invention, the apparatus comprises an arcuate arm extending between a clamp end at the gunwale and a transom end at the stern, a clamp at the clamp end, the clamp being adapted for attaching to the upstanding lip; a downrigger mounting plate fitted to the clamp end; and a flange at the transom end and being adapted for attaching to the transom board so that the apparatus can be secured between the gunwales and the transom board.

DETAILED DESCRIPTION OF THE PREFERRED EMBODIMENT

Figure 1:
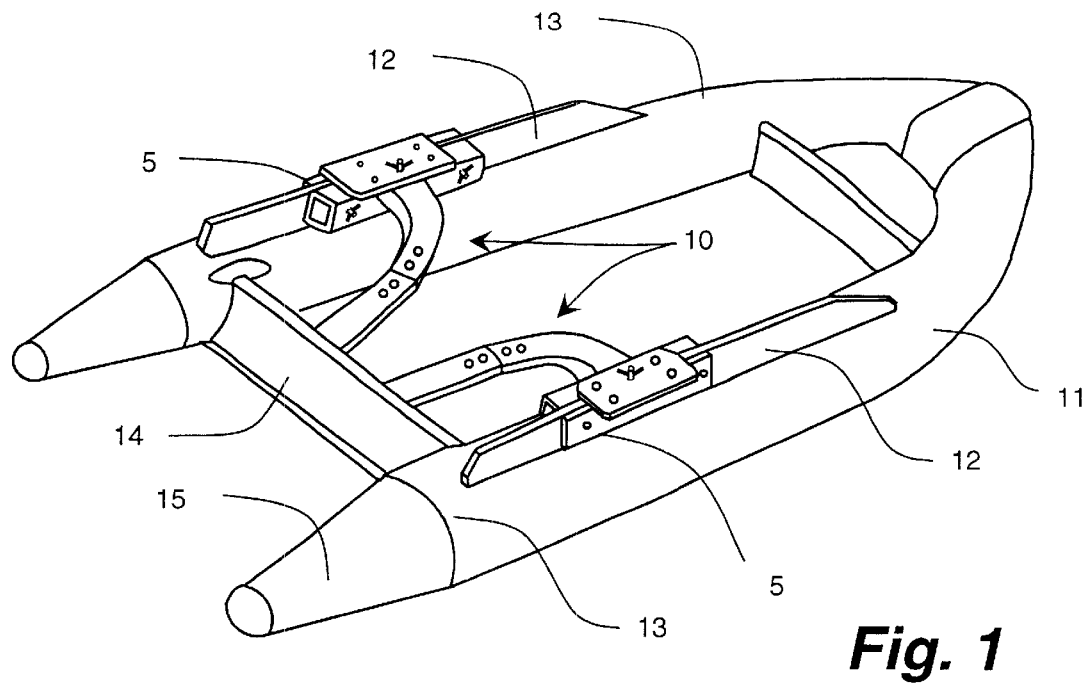
FIG. 1 is a perspective view of an inflatable boat fitted with an embodiment of the downrigger mounting bracket invention.
Figure 5:
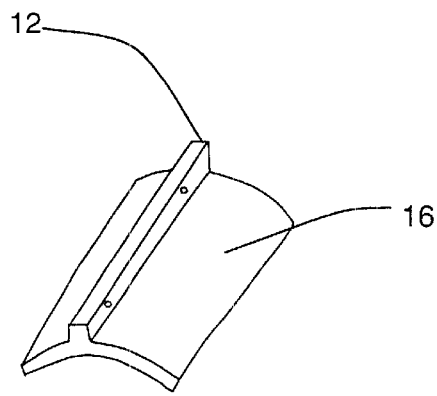
FIG. 5 is a perspective view of a conventional cuff, which if not already present can be added to the gunwale of an inflatable boat to form an upstanding lip.

With reference to FIG. 1, a downrigger mounting apparatus 10 is provided which enables convenient means to mount downriggers (not shown) to an inflatable boat 11. A suitable boat 11 for fitting with the apparatus 10 has an upstanding lip 12 on a gunwale 13 and a transom board 14 at the stern 15 of the boat 11. An example of a lip 12 is shown in FIG. 1 and in FIG. 5. FIG. 5 illustrates a conventional cuff 16 (boat not shown) which is secured to the gunwale of an inflatable boat. The cuff 16 forms the upstanding lip 12.

Figure 2:
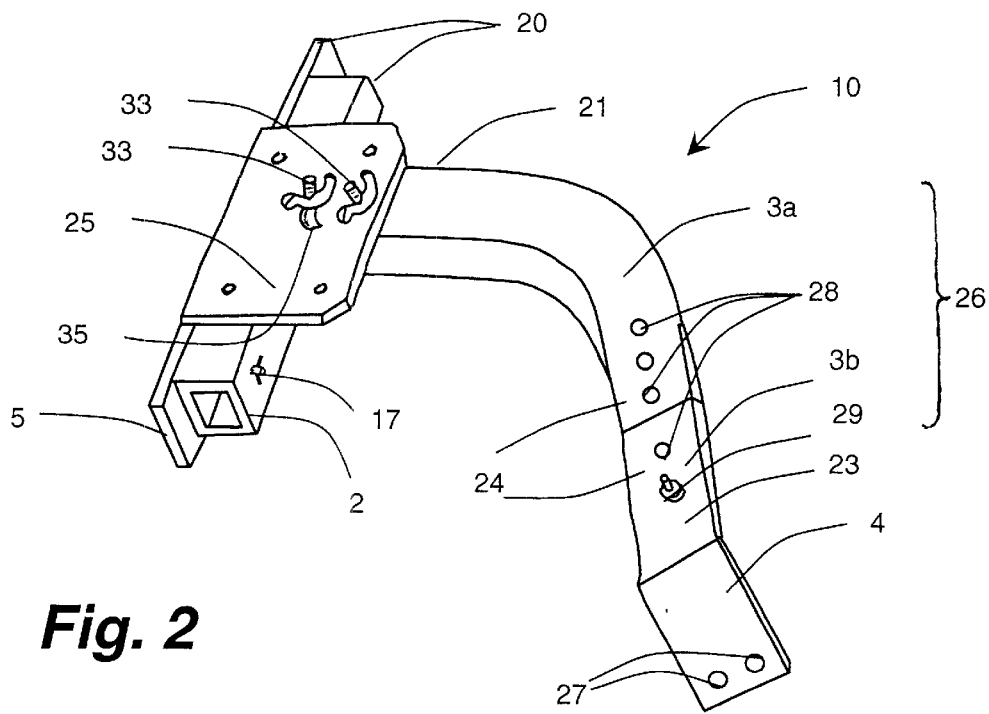
FIG. 2 is a perspective view of the downrigger mounting bracket according to FIG. 1.

Referring also to FIG. 2, the apparatus 10 comprises an assembly or clamp 20 at a clamp end 21 and a mounting flange 4 at a transom end 23. When mounted in a boat 11, an arcuate arm 24 extends between the clamp end 21 at the gunwale 13 and the transom end 23 at the transom board 14. Finally, a downrigger mounting plate 25 is affixed to the clamp end 20.

The clamp 21 attaches to the upstanding lip 12 and comprises two members spaced either side of the lip 12. A plate 5 is fit to an outside of the lip and a tube 2 to the inside of the lip 12. The plate 5 and tube 2 are drawn together to sandwich and hold the lip 12 therebetween using suitable fastening means including a threaded bolt and wing-nut or wing-bolt.

Figure 3:
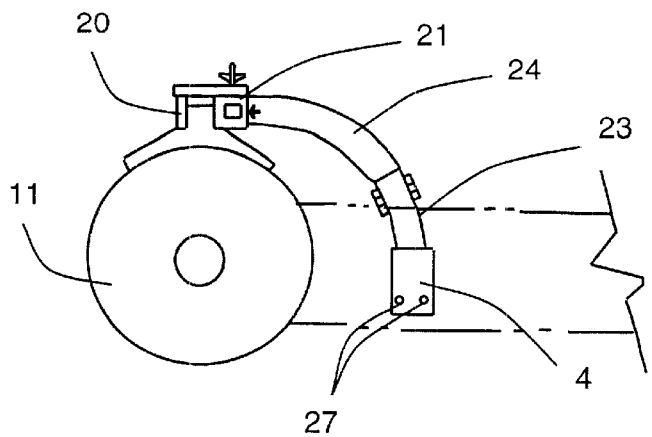
FIG. 3 is a cross-sectional rear view of a mounting bracket fit to a boat and having a direct attachment embodiment of the flange to the transom.

With reference to FIG. 3, the flange 4 can attach directly to the transom board 24 using a plurality of mounting bolt holes 27 formed in the flange.

Figure 4:
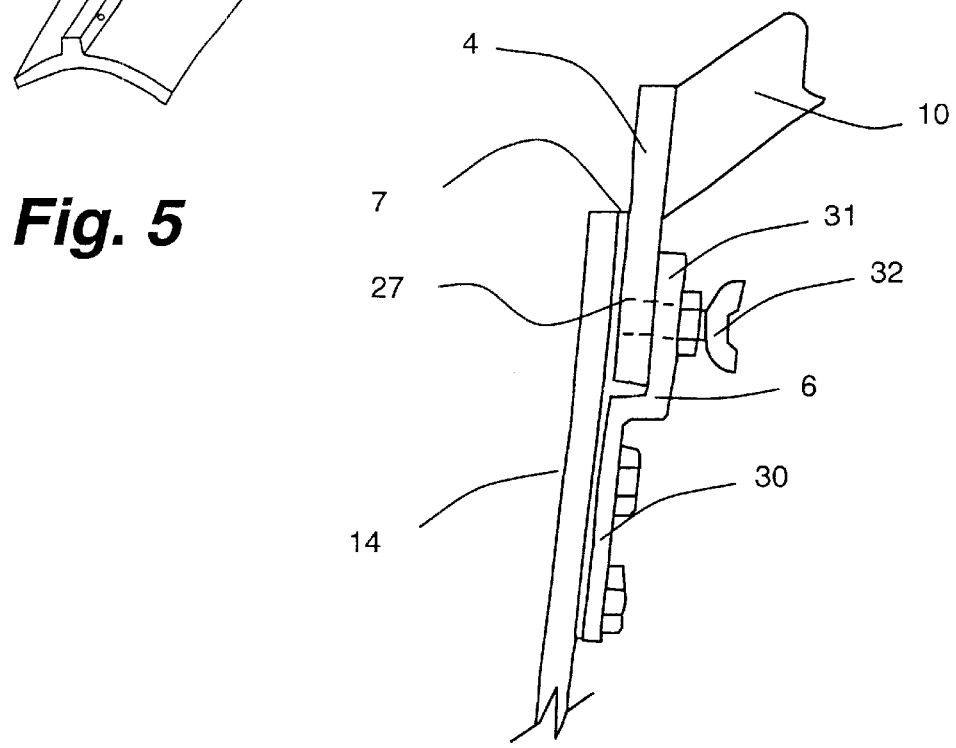
FIG. 4 is a partial cross-sectional side view of the transom having a bracket attachment embodiment of attachment embodiment of the flange to the transom.

In one alternate arrangement, as shown in FIG. 4, the flange 4 can be attached to the transom board 14 using a unitary transom bracket 6. The transom bracket 6 comprises a first member 30 adapted for permanent mounting to the transom board 14 through a spacer 7 and having a second member 31 which is offset from the transom board 14 so as to form a space for accepting the flange 4 slidably therebetween.

The arcuate arm 24 extends substantially laterally from the clamp end 20 towards the inside of the boat 11 and then downwardly and rearwardly to the transom board 14. The arm 24 is formed of aluminum tubing which is light and strong.

To adapt to a variety of boats 11, the arcuate arm 24 is a two-piece arm fitted with means for adjusting its length. Adjusting means 26 enable adjusting the spacing of the flange 4 from the clamp 21.

The adjusting means 26 further comprises tubular members 3a,3b connected with a plurality of alignment holes 28 formed through the tubular members 3a,3b for adjusting the tubular members with respect to each other. Fastening means 29 such as a bolt and nut cooperate with the alignment holes 28 for fixing the two tubular members 3a,3b together.

Best seen in FIG. 2, the apparatus 10 is further adjustable to fit a variety of boat gunwales, transom boards and variable spacing therebetween by enabling a rotation of the arm 24 relative to the clamp 20. The arcuate arm 24 is rotatably connected at the clamp end 21 and through the mounting plate 25 at a first adjustment fastener acting as a pivot 32. A second adjustment fastener bolt 33 extends from the arm's clamp end 21 and through a slot 35 in the mounting plate 25 so that the arm 24, once adjusted to the side or angularly, can then be fixed using the second adjustment fastener.

I claim:

1. Apparatus for mounting a downrigger to a boat having an upstanding lip on a gunwale and a transom board stern comprising:

an arcuate arm extending between a clamp end at the gunwale and a transom end at the transom board, a clamp at the clamp end, the clamp being adapted for attaching to the upstanding lip;

a mounting plate fitted to the clamp end and adapted for mounting a downrigger; and a flange at the transom end and being adapted for attaching to the transom board so that the apparatus can be secured between the gunwale and the transom board.

2. The mounting apparatus of claim 1 wherein, referenced from the clamp end, the arcuate arm extends laterally inward then rearwardly to the transom board.

3. The mounting apparatus of claim 2 further comprising adjusting means intermediate the arcuate arm so as adapt the arm to different spacing between the gunwale and the transom board.

4. The mounting apparatus of claim 3 wherein the adjusting means further comprises:

tubular members having a plurality of alignment holes therethrough; and fastening means cooperating with the alignment holes for fixing the adjusting means.

5. The mounting apparatus of claim 3 wherein the arcuate arm further comprises:

a first fastener bolt for rotatably connecting the arcuate arm to the clamp at a pivot so that the flange end can be angularly adjusted; and a second fastener for securing the arcuate arm to the clamp once rotated.

6. The mounting apparatus of claim 1 wherein the flange is a plate adapted for direct fastening to the transom board with fasteners.

7. The mounting apparatus of claim 1 further comprising a unitary transom bracket having a first member adapted for permanent attachment to the transom and having a second member extending from the first member and offset therefrom so that when mounted to the transom, a space is formed between the second member and the transom for receiving the flange.

8. The mounting apparatus of claim 1 wherein the upstanding lip has outside and inside side walls and the clamp further comprises:

first and second members for placement facing the respective outside and inside side walls; and means for clamping the first and second members to sandwich the lip therebetween.

9. The mounting apparatus of claim 8 wherein the first member is a plate and the second member is a tube and bolts between the first and second members so that when the bolts are tightened, the plate and tube are drawn together for sandwiching the lip therebetween.

* * * * *